E. H. BUTLER.
NUT LOCK.
APPLICATION FILED APR. 26, 1915.

1,206,410. Patented Nov. 28, 1916.

Inventor
E. H. Butler

Witnesses
By Victor J. Evans
Attorney

UNITED STATES PATENT OFFICE.

ERASTUS H. BUTLER, OF KNOXVILLE, MISSISSIPPI.

NUT-LOCK.

1,206,410.

Specification of Letters Patent.

Patented Nov. 28, 1916.

Application filed April 26, 1915. Serial No. 23,970.

*To all whom it may concern:*

Be it known that I, ERASTUS H. BUTLER, a citizen of the United States, residing at Knoxville, in the county of Franklin and State of Mississippi, have invented new and useful Improvements in Nut-Locks, of which the following is a specification.

The present invention relates to improvements in means for effectively securing a nut upon a bolt against vibration, but whereby the said nut may be removed from the bolt when desired and the object of the invention is to simplify and improve the existing art by providing a bolt having a longitudinally extending channel between the end of which is secured a spring that normally projects out of the channel and projects beyond the end of the bolt, and a nut for the bolt having longitudinal depressions within its bore which are adapted to be engaged by the spring of the bolt, the said spring co-acting with the walls of the depressions in such a manner as to permit of the nut being screwed home upon the bolt but to prevent the unscrewing of the nut from the bolt.

With the above and other objects in view, the improvement resides in the construction, combination and arrangement of parts set forth in the following specification and falling within the scope of the appended claim.

Figure 1:
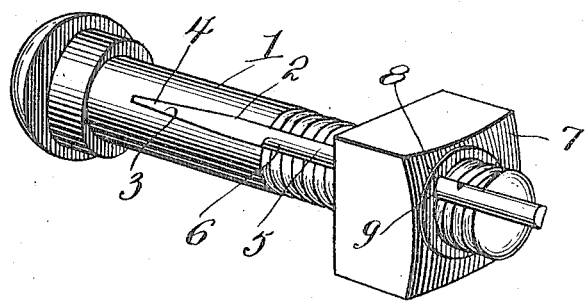
Figure 2:
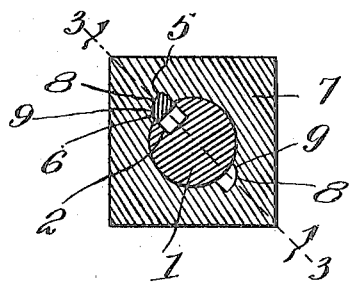
Figure 4:
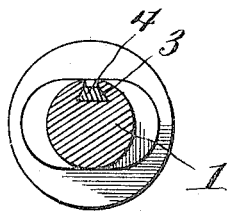
Figure 3:
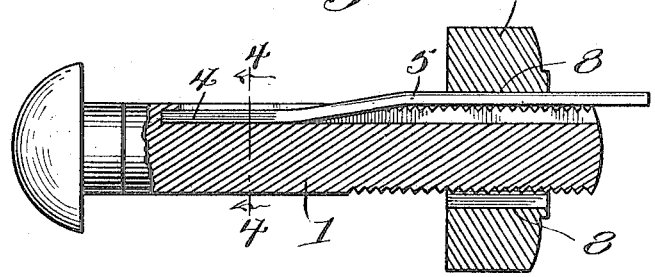

In the drawing: Figure 1 is a perspective view of a nut and bolt connected in accordance with the present invention, Fig. 2 is a transverse sectional view through the nut and bolt, and Fig. 3 is a longitudinal sectional view on the line 3—3 of Fig. 2, and Fig. 4 is a longitudinal sectional view of my invention showing the interior of the nut and bolt.

In the drawing, 1 designates a bolt having its shank provided with a longitudinally extending channel 2 which terminates adjacent the head of the bolt and which projects to the end of the threaded end of the bolt. The channel at its inner end is preferably reduced and the side walls of the said reduced portions may be angular as indicated by the numeral 3. The dove-tailed portion of the channel provided by the walls 3 is adapted to receive the reduced dovetailed end 4 of the longitudinally extending spring lock member 5. The spring through its own resiliency projects itself out of the passage at the threaded portion of the shank of the nut. The spring has one of its longitudinal edges round as indicated by the numeral 6, so that when the threads in the bore of the nut 7 pass over the threads of the bolt when the said nut is screwed upon the bolt in a homeward direction, the same will contact with the rounded edge of the spring and force the said spring to within the channel 2. The nut is provided with a plurality of longitudinally extending depressions or grooves 8, one of the side walls of which being preferably round, as at 9, and the other wall providing a shoulder which is adapted to abut with the straight edge or the edge of the spring opposite that provided with the rounded corner 6 to prevent the unscrewing of the nut from the bolt. It will be obvious that the projecting end of the spring will permit of the same being depressed within the channel 2 and so permit of the unscrewing of the nut from the bolt.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what I claim is:

In combination a threaded bolt, said bolt being formed with a longitudinal channel, said channel extending inwardly of the threads upon the bolt, the edges of the inner end of said channel converging inwardly thereof and being disposed in dove-tailed relation as to incline in opposite directions, the edges of said channel leading from said dove tailed edges being disposed substantially rectangular in cross section and opening out from the threaded end of the bolt, a nut threaded on to the threaded end of the bolt, said nut being formed upon the inner edge of its bore with opposing grooves consisting of a straight and curved edge and a longitudinally extending spring lock member having its inner portion converging and dovetailed into the converging dovetailed edges of the channel of the bolt, said spring lock member having intermediate portions deflected out of in advance from the dovetailed end of said channel, said lock member having its intermediate end portion and outer end portion adapted to dispose so as to lie in the rectangular end of the channel and provided with oppositely straight and curved edges whereby to normally enter the grooves of the nut but depressible into the channel of the bolt.

In testimony whereof I affix my signature in presence of two witnesses.

ERASTUS H. BUTLER.

Witnesses:
H. B. JONES,
J. M. TAYLOR.